(12) United States Patent
Israelsson et al.

(10) Patent No.: US 7,742,765 B2
(45) Date of Patent: Jun. 22, 2010

(54) RADIO ACCESS NODE REGISTRATION FOR MULTIMEDIA BROADCAST MULTICAST SERVICE

(75) Inventors: Martin Israelsson, Spanga (SE); Peter Hans Edlund, Tumba (SE); Ingela Jessica Katarina Ericsson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 686 days.

(21) Appl. No.: 10/597,869

(22) PCT Filed: Feb. 11, 2005

(86) PCT No.: PCT/SE2005/000191

§ 371 (c)(1),
(2), (4) Date: Aug. 10, 2006

(87) PCT Pub. No.: WO2005/078954

PCT Pub. Date: Aug. 25, 2005

(65) Prior Publication Data

US 2007/0105557 A1 May 10, 2007

(30) Foreign Application Priority Data

Feb. 11, 2004 (SE) .................................. 0400340

(51) Int. Cl.
| | |
|---|---|
| H04W 36/00 | (2009.01) |
| H04W 4/00 | (2009.01) |
| G06F 3/033 | (2006.01) |
| H04M 1/725 | (2006.01) |

(52) U.S. Cl. ..................... 455/436; 455/435.1; 455/130; 455/434; 455/412.2

(58) Field of Classification Search ................. 455/436, 455/437, 438, 439, 435.1, 550.1, 515, 560, 455/561, 571, 574, 556.2, 226.3, 226.4, 343.1, 455/343.6, 412.2, 552, 442; 370/468, 444
See application file for complete search history.

(56) References Cited

U.S. PATENT DOCUMENTS 6,434,389 B1 * 8/2002 Meskanen et al. ........... 455/437

(Continued)

FOREIGN PATENT DOCUMENTS

EP    1401152 A2    3/2004

(Continued)

*Primary Examiner*—Lester Kincaid
*Assistant Examiner*—Kuo Woo
(74) *Attorney, Agent, or Firm*—Roger S. Burleigh

(57) ABSTRACT

A radio network control node acts across an Iur interface as a drift radio network control node (262) for a user equipment unit (UE) in a communications system supporting a multimedia broadcast multicast service (MBMS). The drift radio network control node (262) maintains a first counter for counting a number of events occurring at the drift radio network control node (262). Registration of the drift radio network control node (262) with a core network node (30) is advantageously delayed until the counter has exceeded a first threshold value. In one example mode, the number of events occurring at the drift network control node (262) which is counted by the counter is a number of user equipment units for which a Iur linking procedure is performed for the MBMS session. In another example mode, the number of events occurring at the drift network control node (262) which is counted by the counter are time periods elapsed since an Iur linking procedure for the MBMS session has been performed for a predetermined user equipment unit.

10 Claims, 12 Drawing Sheets

U.S. PATENT DOCUMENTS

| | | | |
|---|---|---|---|
| 2001/0049287 A1* | 12/2001 | Plunkett | 455/436 |
| 2002/0068571 A1* | 6/2002 | Ohlsson et al. | 455/442 |
| 2004/0116139 A1 | 6/2004 | Yi | |
| 2004/0151133 A1 | 8/2004 | Yi | |
| 2004/0152453 A1* | 8/2004 | Hayashi | 455/412.2 |
| 2004/0157640 A1* | 8/2004 | Pirskanen et al. | 455/552.1 |
| 2004/0223513 A1* | 11/2004 | Meago | 370/468 |

FOREIGN PATENT DOCUMENTS

| | | |
|---|---|---|
| EP | 1492249 A1 | 12/2004 |
| WO | WO 2004071117 A1 | 8/2004 |

* cited by examiner

RADIO ACCESS NODE REGISTRATION FOR MULTIMEDIA BROADCAST MULTICAST SERVICE

BACKGROUND

1. Technical Field

The technical field relates to multimedia broadcasting and/or multicasting in a wireless communications context.

2. Related Art and Other Considerations

There is an ever increasing demand for wireless communication devices to perform a variety of applications. Current and future generations of mobile wireless communications devices, referred generally and generically hereafter as user equipment units (UEs), are striving to deliver multimedia services using one or both multicasting or broadcasting modes. Multicasting directs streaming media (audio, video, etc.) to plural specific subscribers. In contrast, broadcasting provides content that can be accessed by anyone with suitable equipment. Television and radio are examples of broadcasting, and a pay-per-view webcast is an example of multicasting.

A new service, called multimedia broadcast multicast service (MBMS), is being developed for both these modes of operation. MBMS will provide point-to-multi-point transmissions of multimedia data like text, audio, and video from a single point source over a radio interface to a broadcast area or to a multicast group. Although the content will typically be in a streaming format, e.g., MPEG/H.261 visual data and associated audio data, any content or format may be used. Similarly, the media can be delivered streamed, on-demand, or at a scheduled time. MBMS is described, e.g., in 3GPP TS 25.246 v6.3.0 (2004-06), $3^{rd}$ Generation Partnership Project: Technical Specification Group Services and Systems Aspects; Multimedia Broadcast/Multicast Service (MBMS); Architecture and functional description (Release 6).

The MBMS session content is provided as a data stream from the content provider to a gateway GPRS support node (GGSN) in the packet data core network. The GGSN delivers the data stream to each serving GPRS support node (SGSN) that has one or more user equipment unit MBMS subscribers having an "activated MBMS context" in the SGSN's geographic coverage area. A base station controller (BSC) may well supervise the cell areas in which user equipment units (UEs) from multiple SGSNs in the MBMS session pool are located.

FIG. 1 illustrates an example system that supports wireless communications and MBMS services. This system may accommodate one or more standard architectures including a universal mobile telecommunications system (UMTS) (as well as other systems) based on code division multiple access (CDMA), GPRS/EDGE and other systems based on time division multiple access (TDMA), etc.

As shown in FIG. 1, one or more example radio access networks (RAN) provide radio access services to/from a user equipment unit (UE) 20 over a wireless interface (e.g., Uu or Um). Interfaces are represented in FIG. 1 by dot-dashed lines. The user equipment unit (UE) 20, also termed a mobile terminal, can be any mobile station such as a mobile telephone ("cellular" telephone) and laptops with mobile termination, and thus can be, for example, portable, pocket, hand-held, computer-included, or a car-mounted mobile device which communicates voice and/or data with the radio access network.

The example radio access networks can include one or more of a UMTS terrestrial radio access network (UTRAN) 24 and a GPRS/EDGE radio access network (GERAN) 25, both of which are used in third generation cellular systems. The RAN may also be a generic access network (GAN) and the RAN node a generic access network controller (GANC). Transport of information over the communications interface between the RBS/Node B and RNC/BSC/GANC interfaces is typically based on asynchronous transfer mode (ATM) or Internet Protocol (IP).

A RAN includes one or more radio network controllers (RNCs), base station controllers (BSCs), or generic access network controllers (GANCs). Each controller is coupled to one or more radio base stations (BSs), sometimes referred to as Node B's. For example, the UTRAN 24 illustrated in FIG. 1 has included one or more radio network controllers (RNCs) 26 and one or more base stations (BS) 28. For sake of simplicity, the UTRAN 24 of FIG. 1 is shown with only two RNC nodes, particularly RNC $26_1$ and RNC$26_2$. Each RNC 26 is connected to one or more base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. Each base station can serve one or more cells. It will be appreciated that a different number of base stations can be served by each RNC, and that RNCs need not serve the same number of base stations.

FIG. 1 shows that an RNC can be connected over an Iur interface to one or more other RNCs in the UTRAN 24. In order to support continuation of established connections when the UE is moving between cells controlled by different RNCs in the Radio Access Network, a Signalling Network (e.g. Signalling System No 7) enables RNCs to perform the required RNC-RNC signaling.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

The UTRAN 24 communicates with core network serving GPRS support nodes (SGSNs) 30 over an Iu interface. The GERAN 25 communicates with core network serving GPRS support nodes (SGSNs) 30 over a Gb (or optionally Iu) interface.

SGSN 30 supports packet-based communications and provides functions such as authentication, ciphering, mobility management, charging data, and logical link management toward the user equipment unit 20. SGSN 30 is coupled to a UE subscriber database called the home location register (HLR) 32 over a Gr interface.

A gateway GPRS support node (GGSN) 34 communicates with one or more SGSNs over a Gn/Gp interface. Gateway GRPS support node (GGSN) 34 provides the interface towards the packet-switched networks (e.g., the Internet, X.25 external networks) and translates data formats, signaling protocols, and address information in order to permit communication between the different networks.

The gateway GPRS support node (GGSN) 34 communicates with a broadcast multicast service center (BM-SC) 36 over a Gmb/Gi interface. The multicast/broadcast content is provided by a MBMS content provider 38.

The broadcast multicast service center (BM-SC) 36 provides functions for MBMS user service provisioning and delivery such as serving as an entry point for content provider MBMS transmissions and authorizing and initiating MBMS Bearer Services within the PLMN. The BM-SC 36 is a functional entity that exists for each MBMS User Service. The BM-SC 36 generates charging records for content provider transmitted data, and provides the GGSN 34 with transport associated parameters such as quality-of-service and one or more MBMS service areas. Further, the BM-SC 36 may schedule MBMS session transmissions and retransmissions, retrieve content from external sources and provide this content using MBMS bearer services. The BM-SC 36 labels each MBMS session with an MBMS Session Identifier to allow the UE 20 to distinguish the MBMS session retransmissions. Each transmission and subsequent retransmission of a specific MBMS session are identified by a common MBMS Session Identifier (e.g., 2-3 octets) passed at the application layer in the content, which may also be passed in a shortened form (i.e., the least significant octet) in a MBMS Session Start Request message to sent to the RNCs/BSCs/GANCs in the RANs.

The GGSN 34 serves as an entry point for IP multicast traffic as MBMS data. Upon notification from the BM-SC 36, the GGSN 34 requests establishment of a bearer plane for a broadcast or multicast MBMS transmission. Bearer plane establishment for multicast services is carried out towards each SGSN (usually there are multiple such SGSNs) that have requested to receive transmissions for the specific multicast MBMS bearer service. The GGSN 34 receives IP multicast traffic (whether from BM-SC 36 or other data sources) and routes the traffic to the proper GTP tunnels set-up as part of the MBMS bearer service.

The SGSN role within MBMS architecture is, e.g., to perform MBMS bearer service control functions for each individual UE and to provide MBMS transmissions to UTRAN/GERAN/GAN. The SGSN 30 supports intra-SGSN and inter-SGSN mobility procedures, which requires the SGSN 30 to store a user-specific MBMS UE context for each activated multicast MBMS bearer service and to pass these user-specific MBMS UE contexts to the new SGSN during inter-SGSN mobility procedures. The SGSN 30 must generate charging data per multicast MBMS bearer service for each user. Each SGSN 30 initially tries to establish Iu/Gb and Gn bearers shared by many users on demand when data has to be transferred to the users. But as described below, the Iu and Gb bearer establishment is controlled by the RNC/BSC/or GANC.

FIG. 2 illustrates phases of an MBMS multicast service. There are eight phases: subscription, service announcement, joining, session start, MBMS notification, data transfer, session stop, and leaving. The subscription, joining, and leaving phases are performed individually per user. The other phases are performed for all users interested in the related service.

The subscription phase establishes the relationship between the user and the service provider, which allows the user to receive the related MBMS multicast service. A subscription is an agreement of a user to receive service(s) offered by an operator. Subscription information is recorded in the BM-SC. MBMS user service announcement/discovery mechanisms allow users to request or be informed about the range of MBMS user services available.

A service announcement distributes to users information about the service, parameters required for service activation (e.g. IP multicast address), and possibly other service-related parameters (e.g. service start time).

Joining (i.e., MBMS multicast activation by the user) is the process by which a subscriber joins (becomes a member of) a multicast group, i.e., the user indicates to the network that he/she is willing to receive multicast mode data of a specific MBMS bearer service.

Session start is the point at which the BM-SC is ready to send data and occurs independently of activation of the service by the user. Session start also triggers bearer resource establishment for MBMS data transfer.

MBMS notification informs the UEs about forthcoming (and potentially about ongoing) MBMS multicast data transfer, and data transfer is the phase when MBMS data are transferred to the UEs.

Session stop is the point at which the BM-SC determines that there will be no more data to send for some period of time. This period is preferably long enough to justify removal of bearer resources associated with the session. At the leaving phase, a subscriber leaves (stops being a member of) a multicast group.

FIG. 3 illustrates phases of an MBMS broadcast service. There are five phases: service announcement, session start, MBMS notification, data transfer, and session stop. These phases have already been described above.

Radio Resource Control (RRC) is a layer 3 signalling protocol used between the radio access network and the user equipment unit (UE) 20, to support the management of radio resources. A user equipment unit (UE) 20 in the RRC protocol operates in a state model conceptualized as having two modes: an Idle Mode and a Connection Mode. The Idle Mode is entered after power on. In Idle Mode there is no connection between the user equipment unit (UE) and the UTRAN. When a connection is established, the user equipment unit (UE) is assigned a U-RNTI and the mobile terminal enters Connected Mode. The U-RNTI (UTRAN Radio Network Temporary Identity) is a global identity, which can be used in any cell in the UTRAN.

A URA (UTRAN Routing Area) is a geographical area comprising of one or more cells. Each URA is identified by a unique identity, which is broadcast in all cells belonging to the URA. A URA can comprise cells controlled by more than one RNC Within Connected Mode there are four different states: CELL_DCH state; CELL_FACH state; CELL_PCH state; and URA_PCH. Each state reflects a different level of activity. The CELL_DCH state is characterized, e.g., by having a dedicated channel (DCH) assigned to the user equipment unit (UE). In the CELL_FACH state, no dedicated physical channel is assigned, but the user equipment unit (UE) listens continuously to a common channel (the FACH) in the downlink belonging to the selected cell. In the uplink, the user equipment unit (UE) typically uses a random access channel (RACH). In the CELL_PCH state, the user equipment unit (UE) monitors a paging channel (PCH) of a selected cell. The URA_PCH state is almost identical to the CELL_PCH state. The difference is that the user equipment unit (UE) does only update the network of its location after crossing URA borders. An URA (UTRAN. Registration Area) is a group of cells. This means that in this state the position of the user equipment unit (UE) is in general known only on URA level.

Each RNC 26 which is controlling one or several cells within an MBMS Service area maintains a CRNC MBMS Service Context ("MBMS Service Context") for each MSM Service. The MBMS Service Context contains a list of PMM connected mode user equipment units (UEs) which are present in one or several cells of the RNC and which have activated the MBMS service, and/or a list of UTRAN Routing Areas (URAs) in which there is at least one URA_PCH user equipment unit (UE) which has activated the MBMS service. The list includes at least the U-RNTI of the user equipment units (UEs) in a state other than URA-PCH and/or URA identifiers (URA-IDs).

In standards there are basically three methods described where MBMS Service Context is built up in RAN (see, e.g., 3GPP TS 25.346 v6.3.0 (2004-12), $3^{rd}$ Generation Partnership Project: Technical Specification Group Radio Access Network; Introduction of the Multimedia Broadcast Multicast Service (MBMS) in the Radio Access Network (RAN); Stage 2 (Release 6)). These three methods refer to "RNC registration". RNC Registration for a certain MBMS service denotes the process wherein the core network, e.g., SGSN 30, becomes aware of an RNC hosting user equipment units (UEs), which have activated that MBMS service.

A first method for acquiring a MBMS Service Context involves implicit registration of a RNC node to the core network. This is the implicit (no additional signaling required over Iu) method where a RNC in it is role of SRNC is registered in a SGSN whenever a mobile moves (from RRC Idle/URA_PCH/CELL_PCH) to CELL_FACH/CELL_DCH to set up a PS RAB at MBMS join or in CELL_FACH/CELL_DCH is joining a MBMS Service.

A second method for acquiring a MBMS Service Context involves explicit registration of a RNC node to the core network. This is the explicit method where a RNC in it is role of DRNC signals to its default SGSN to be registered for the first joined UE for which it is a DRNC.

A third method for acquiring a MBMS Service Context involves registration based on Routing Areas (RA). This is an implicit method where the RAs are registered for mobiles which have joined the MBMS service. The RAU procedure implicitly gives the RA for joined mobiles.

The registration information is used by the core network to distribute a MBMS Session Start Request message to RNCs where there are joined user equipment units (UEs) and to set up Iu user plane resources for the MBMS session.

Another important issue is that the MBMS Session Start Request message paging over UTRAN, the implication of this is that paging load.

So far the stage 2 specification (3GPP TS 25.346) specifies that the UE is linked to a MBMS Service Context in the SRNC when the mobile is joining the service and is in PMM-CONNECTED, or in case the mobile sets up a packet switch radio access bearer (PS RAB). This may happen at any point in time, before and during sessions. The consequences of this are that a MBMS UE context will be established in the SRNC via the UE linking procedure over Iu, whenever the mobile is joining the service.

According to 3GPP TS 25.346 v6.3.0, a MBMS Service Context for a session is made available to RAN via individual UE linking over Iu before session start. The SRNC uses the context information for tracking purposes, point-to-point (ptp) bearer set up and for paging considerations. The SRNC is also responsible for Iur-linking.

3GPP TS 25.346 v6.3.0 does not specifically state when the Iur-linking procedure occurs, i.e., when the DRNC is informed of the MBMS UE context from SRNC. The main purpose of Iur-linking is to provide the DRNC (in its role of the CRNC) with information for making a ptp/ptm (point-to-point/point-to-multipoint) decision on a cell by cell basis, and for channel configuration for the MBMS transmission in case of a point-to-multipoint (ptm) decision. There are two main possibilities: Early Iur-linking and late Iur-linking, i.e. Iur-linking only at MBMS session start.

3GPP TS 25.346 v6.3.0 allows linking over Iur to be performed at service activation, at session start, and during an ongoing session (a user equipment joins an ongoing session). The early Iur-linking and late Iur-linking are indeed one and the same procedure. They differ only in the circumstances when they are respectively triggered. The early Iur-linking is a complementary procedure, such that late Iur-linking is a mandated procedure and must be implemented in SRNC to support late arrivals of user equipment units (UEs) when a session has started. The early Iur-linking is an optional feature and provides optimization of signalling load processing at MBMS session start.

What is needed, therefore, and an object herein provided for, are means, methods, and techniques for providing or controlling registration of a drift radio network control node at a core network in conjunction with a Iur Linking Procedure for a MBMS service.

SUMMARY OF THE INVENTION

A radio network control node acts across an Iur interface as a drift radio network control node for a user equipment unit (UE) in a communications system supporting a multimedia broadcast multicast service (MBMS). The drift radio network control node maintains a first counter for counting a number of events occurring at the drift radio network control node. Said events are of interest with regard to their power consumption. Registration of the drift radio network control node with a core network node is advantageously delayed until the counter has exceeded a first threshold value. In one example mode, the number of events; occurring at the drift network control node which is counted by the counter is a number of user equipment units for which an Iur linking procedure is performed for the MBMS session. In another example mode, the number of events occurring at the drift network control node which is counted by the counter are time periods elapsed since an Iur linking procedure for the MBMS session has been performed for a predetermined user equipment unit. Other modes are also encompassed.

Delay of registration, also known herein as conditional registration inhibit, guards against any tendency of the drift network control node to, e.g., send a registration request either too early or too late to the core network. If a request for registration is sent too early, it may turn out that the number of UEs requesting the MBMS service has decreased significantly before the session begins. On the other hand, a late request for registration may preclude the core network from sending a start indication for the MBMS session in sufficient time.

As an additional optional feature, deregistration of the drift network control node can be delayed until the counter has a value below a second threshold value. Preferably the second threshold value is selected to provide hysteresis protection.

This technology may be implemented in a variety of different networks. For example, the RAN may be a GSM EDGE RAN (GERAN) and the RAN node a base station controller (BSC). The RAN may be a UMTS Terrestrial RAN (UTRAN) and the RAN node a radio network controller (RNC). The RAN may be a generic access network (GAN) and the RAN node a generic access network controller (GANC).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5B showing a late Iur-linking by reception of RANAP Start Session; and FIG. 5C showing an enhanced Iur-linking with session parameters provided.

DETAILED DESCRIPTION

In the following description, for purposes of explanation and non-limitation, specific details are set forth, such as particular nodes, functional entities, techniques, protocols, standards, etc. in order to provide an understanding of the described technology. For example, one advantageous application is to multimedia communications in accordance with $3^{rd}$ Generation Project Partnership (3GPP) specifications. But other applications and other standards may be employed. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1:
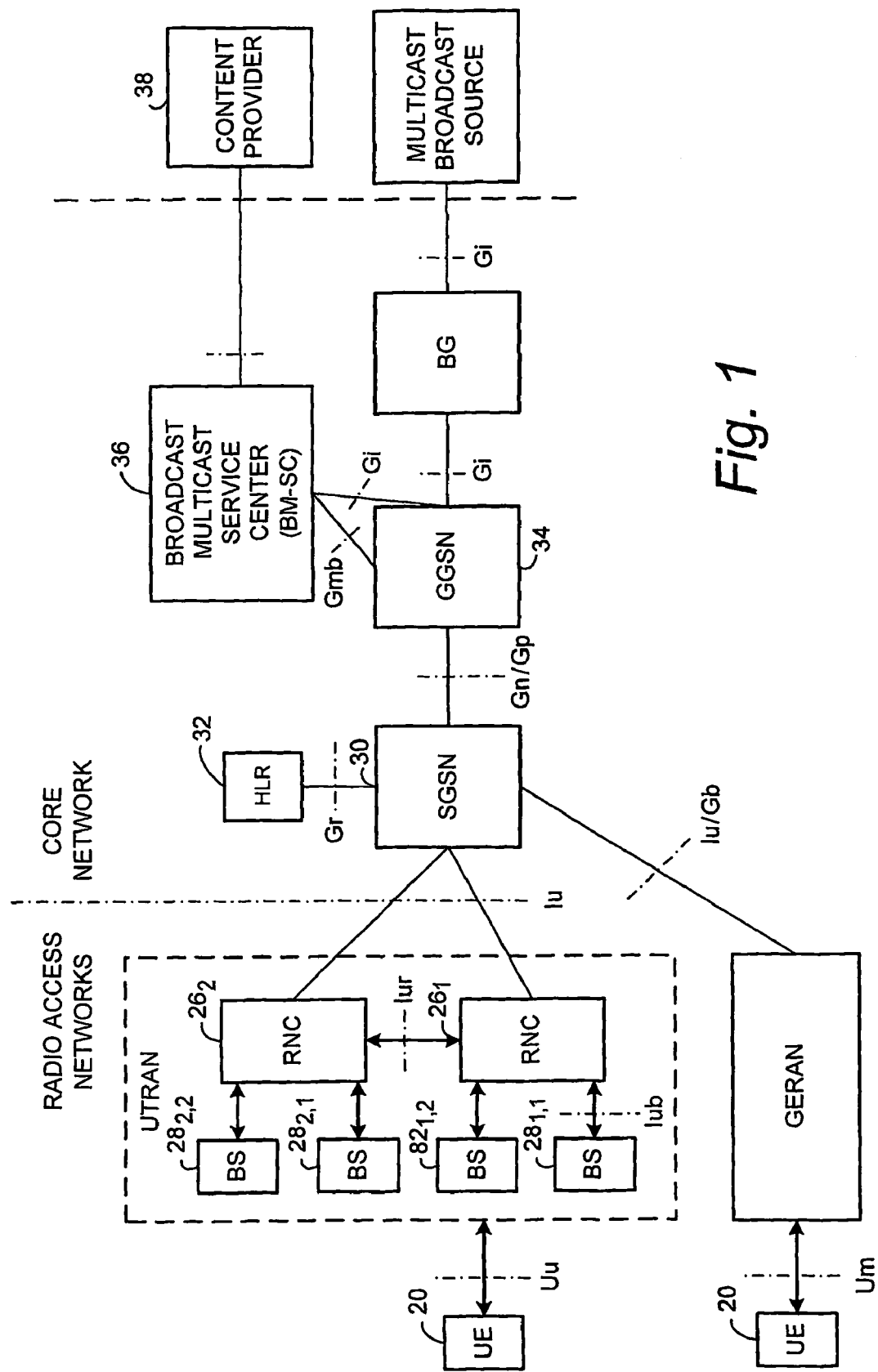
FIG. 1 is a function block diagram showing an example wireless communication system in which MBMS technology may be used.
Figure 3:
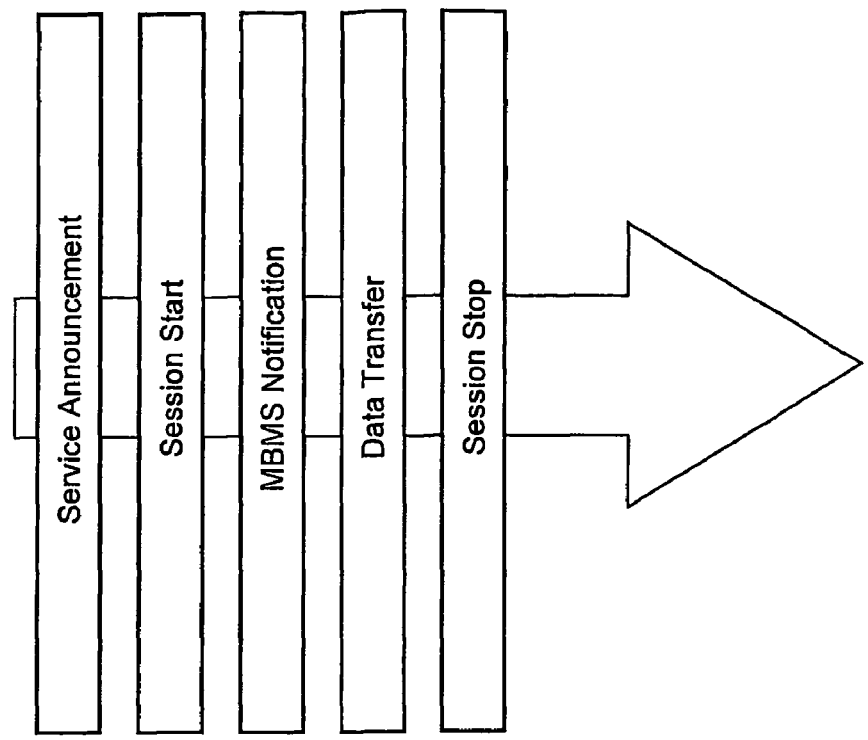
FIG. 3 illustrates phases of MBMS broadcast service provision.
Figure 2:
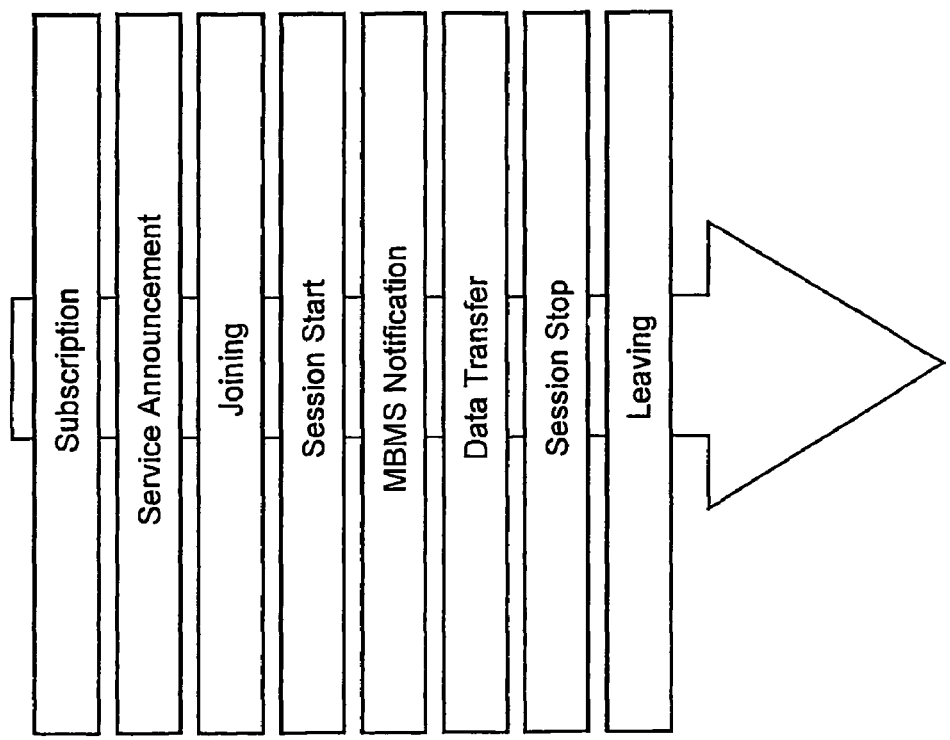
FIG. 2 illustrates phases of MBMS multicast service provision.
Figure 4A:
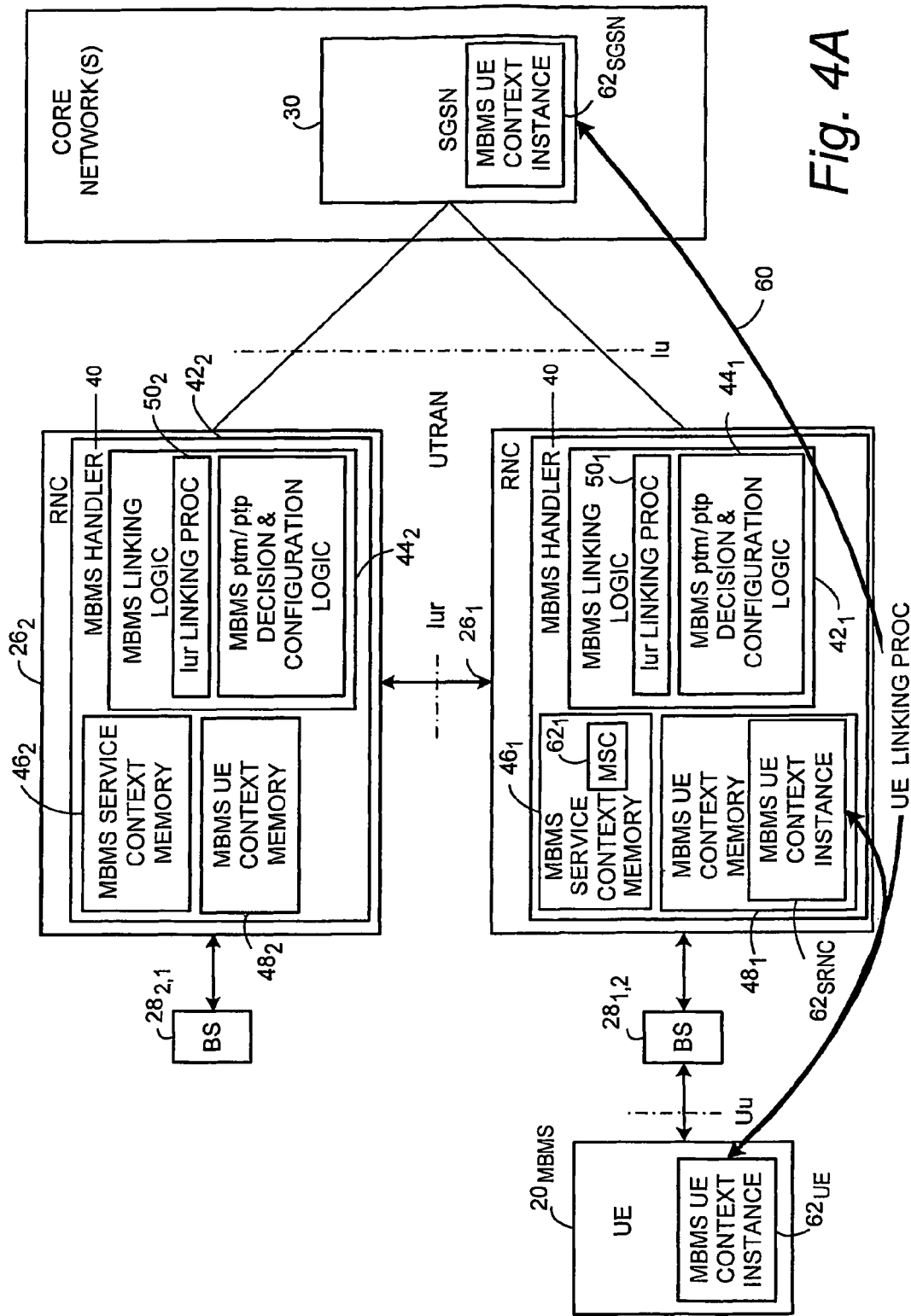
FIG. 4A is a schematic diagram showing a UTRAN wherein a user equipment unit has joined a MBMS service.

FIG. 4A resembles FIG. 1 in showing selected aspects of an example, non-limiting UTRAN 24 as comprising RNC $26_1$ and DRNC $26_2$. RNC $26_1$ and RNC $26_2$ are connected over the Iur interface. The RNC $26_1$ controls one or more cells including a cell which is centered at or anchored by base station $28_{1,2}$. Similarly, RNC $26_2$ controls one or more cells including a cell which is centered at or anchored by base station $28_{2,1}$. While not specifically mentioned herein, all foregoing considerations of FIG. 1 are applicable to FIG. 4A, including the connection of UTRAN 24 over the Iu interface to one or more core networks, with the core network(s) comprising one or more SGSNs 30 (only a representative SGSN 30 being shown in FIG. 4A).

Each RNC 26 includes a MBMS Handler 40 which facilitates provision of a MBMS service to the user equipment units (UEs) served thereby. The MBMS Handler 40 in turn comprises MBMS linking logic 42; MBMS ptm/ptp decision/configuration logic 44; MBMS service context memory 46; and MBMS UE context memory 48. The MBMS linking logic 42 further includes, e.g., Iur Linking Procedure 50. It will be appreciated that, for sake of brevity and in view of being understood by the person skilled in the art, other traditional constituent elements of the radio network controller (RNC) nodes are not illustrated, such as a main processor (and possibly auxiliary processors), timing and control units, packet control unit(s), codec(s), data services application unit(s), diversity handover units, resource and power managers, interfaces (to base stations, to the core networks, to other RNCs). Moreover, the MBMS Handler 40 and constituent elements drawn or described as internal thereto can be realized or implemented using individual hardware circuits, using software programs and data in conjunction with one or more centralized and/or distributed suitably programmed microprocessor(s) or general purpose computer(s), using applications specific integrated circuitry (ASIC), and/or using one or more digital signal processors (DSPs). While terms such as "logic" and "procedure" and "routine" have been employed herein, such terms are not intended to impart any particular modularity or hierarchial confinement or the like to the actions performed thereby as herein described.

At the time shown in FIG. 4A, the user equipment unit (UE) $20_{MBMS}$ has joined at least one MBMS service, e.g., has already participated in a UE Linking Procedure (reflected by arrow 60). As part of the UE Linking Procedure 60, an instance of a MBMS UE Context has been created in the UE, RNC, SGSN, GGSN, and BM-SC when the UE joins a MBMS bearer service. FIG. 4A shows MBMS UE Context $62_{UE}$ created at user equipment unit (UE) $20_{MBMS}$; MBMS UE Context $62_{SRNC}$ created at RNC $26_1$ (in MBMS UE context memory 48); and MBMS UE Context $62_{SGSN}$ created at SGSN 30. The MBMS UE Context contains UE-specific information related to the particular MBMS bearer service that the UE has joined. There is one MBMS UE Context per MBMS bearer service that the UE has joined. Each MBMS UE Context may include, for example, an IP multicast address identifying an MBMS bearer that the UE has joined, a Temporary Mobile Group Identity (TMGI) allocated to the MBMS bearer, and an IMSI identifying the user.

Moreover, as part of the UE Linking Procedure 60, the user equipment unit (UE) $20_{MBMS}$ is linked to a MBMS Service Context (MSC) $66_1$ for the particular MBMS service which user equipment unit (UE) $20_{MBMS}$ has joined or seeks to join.

Figure 4B:
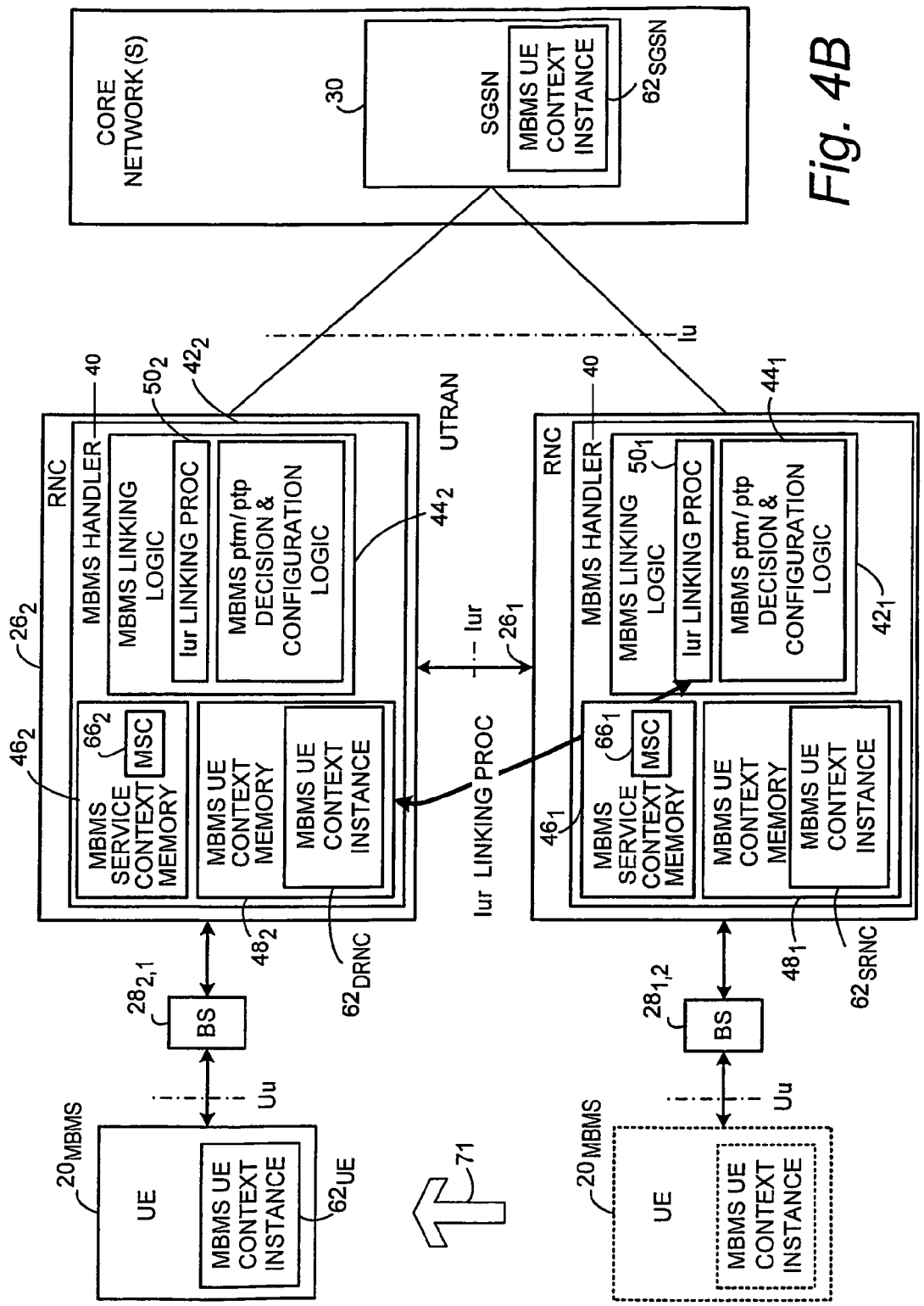
FIG. 4B is a schematic diagram showing the user equipment unit of FIG. 4A moving in a manner to invoke an Iur Linking Procedure.

Assuming that user equipment unit (UE) $20_{MBMS}$ is in CELL_FACH or CELL_DCH, an Iur Linking Procedure 50 can be invoked as shown in FIG. 4B and discussed below. FIG. 4B shows the user equipment unit of FIG. 4A moving in a manner to invoke Iur Linking Procedure 50. Movement of the user equipment unit (UE) is depicted by arrow 71 in FIG. 4B, which shows the user equipment unit (UE) as having moved from a position shown in broken or dotted lines to the position served by base station $28_{2,1}$ shown by solid lines. In other words, in FIG. 4A the Iur-linking procedure occurs as a result of mobility of the user equipment, unit (UE) in the URAN. A UE such as user equipment unit (UE) $20_{MBMS}$ in RRC_CONNECTED mode moving from the SRNC (e.g., SRNC $26_1$) to another RNC (e.g., DRNC $26_2$) results in Iur-linking, which involves creation of MBMS UE Context $62_{DRNC}$ as shown in FIG. 4B. Before MBMS service session start the Iur-linking procedure 50 can be implemented as an RNSAP MBMS Attach Request procedure. During the MBMS service session it may be incorporated in existing elementary procedure RL Set Up in case of point-to-point (ptp). In case the target cell is already configured for point-to-multipoint (ptm), the SRNC may either incorporate Iur linking in the elementary procedure Common Transport Channel Resources procedure or only invoke the RNSAP MBMS Attach Request procedure. The inclusion of elementary procedure for Iur-linking is not addressed further herein. In view of the Iur Linking Procedure 50 performed in FIG. 4B, a MBMS Service Context $66_2$ is stored in MBMS service context memory $46_2$ of DRNC $26_2$.

Figure 4C:
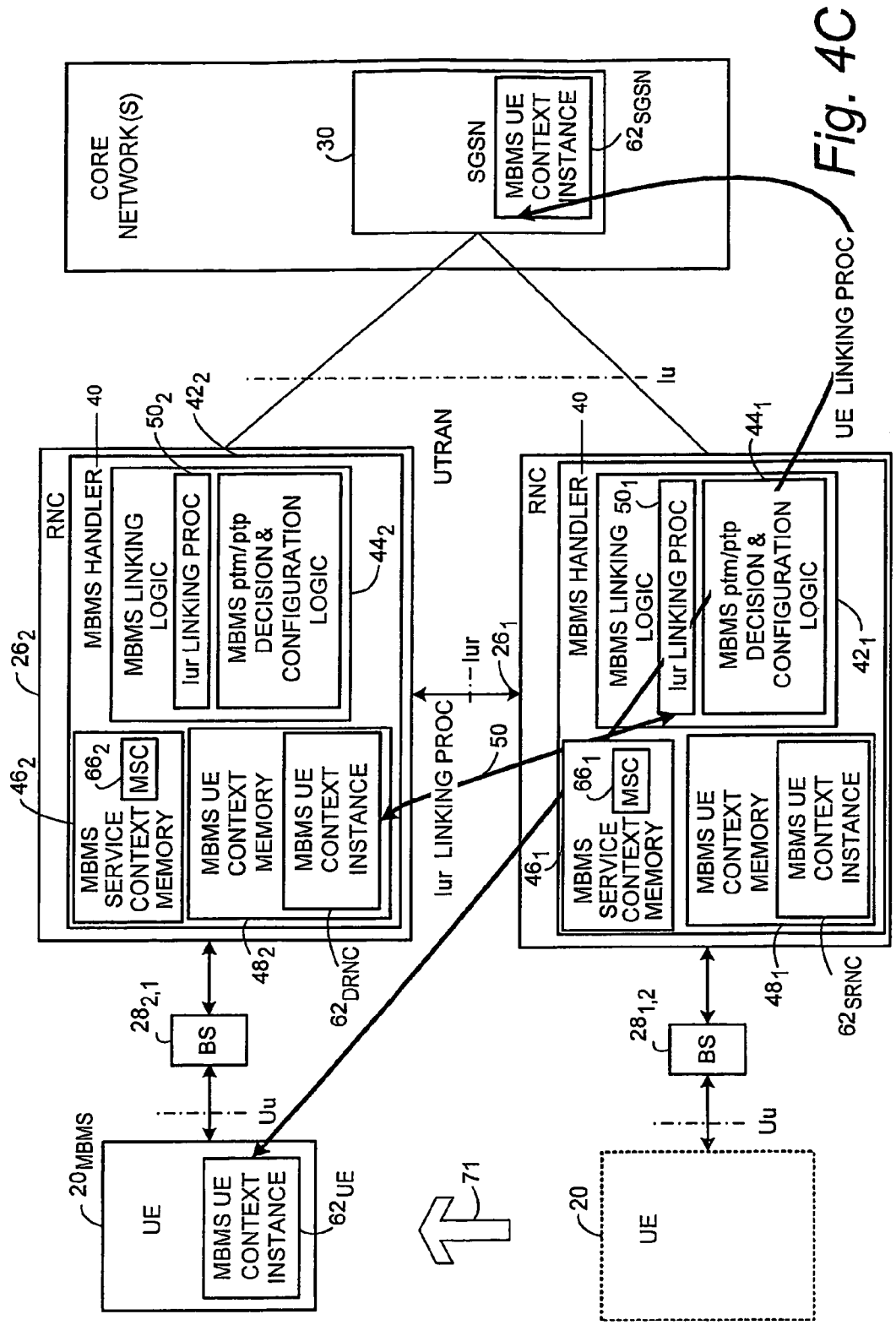
FIG. 4C is a schematic diagram showing the user equipment unit of FIG. 4A invoking an Iur Linking Procedure after registration from a DRNC.

FIG. 4C illustrates another situation in which Iur Linking Procedure 50 may be invoked. In FIG. 4C, prior to joining the MBMS service the user equipment unit (UE) is depicted as user equipment unit (UE) 20 as shown in broken or dotted lines. In FIG. 4C, the user equipment unit (UE) $20_{MBMS}$ seeks to join the MBMS service when user equipment unit (UE) is already in a cell whose resources are controlled by DRNC $26_2$. FIG. 4C shows that the user equipment unit (UE) had not joined the MBMS service by the time the user equipment unit (UE) left the cell controlled by base station $28_{1,2}$. Rather, after moving into a cell served by base station $28_{2,1}$, the user equipment unit (UE) sets up a UE-dedicated connection with the core network while the core network initiates the Iu-linking procedure, which results in a MBMS UE context in the RNC. After this the UE Linking Procedure 60' is performed and results in MBMS UE Contexts $62_{SRNC}$, $62_{SGSN}$, and $62_{UE}$ being created in each of RNC $26_1$, SGSN 30, and user equipment unit (UE) $20_{MBMS}$, respectively. Additionally, performance of the UE Linking Procedure 60' causes creation of MBMS Service Context $66_1$ in SRNC $26_1$. Upon joining the MBMS service, the user equipment unit (UE) becomes labelled as user equipment unit (UE) $20_{MBMS}$. Invocation of the Iur Linking Procedure 50 caused by user equipment unit (UE) $20_{MBMS}$ joining the MBMS service results in creation of MBMS UE Context $62_{DRNC}$ in MBMS UE context memory 48 of DRNC $26_2$.

Figure 5A:
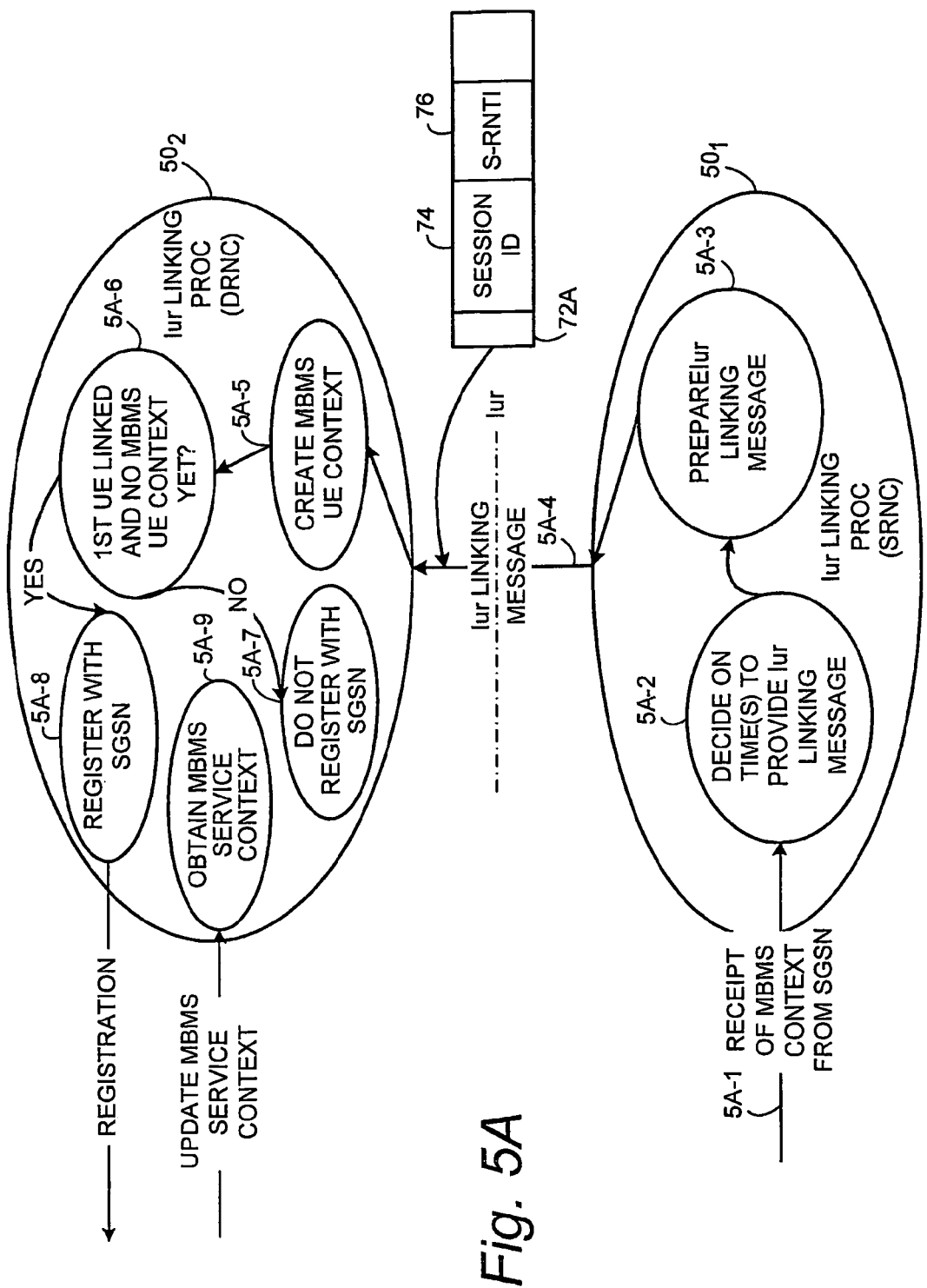
FIG. 5A, FIG. 5B, and FIG. 5C are schematic diagrams illustrating alternative example ways in which an Iur Linking Procedure can be commenced and performed, with FIG. 5A showing an early Iur-linking triggered by Iu-linking.
Figure 5B:
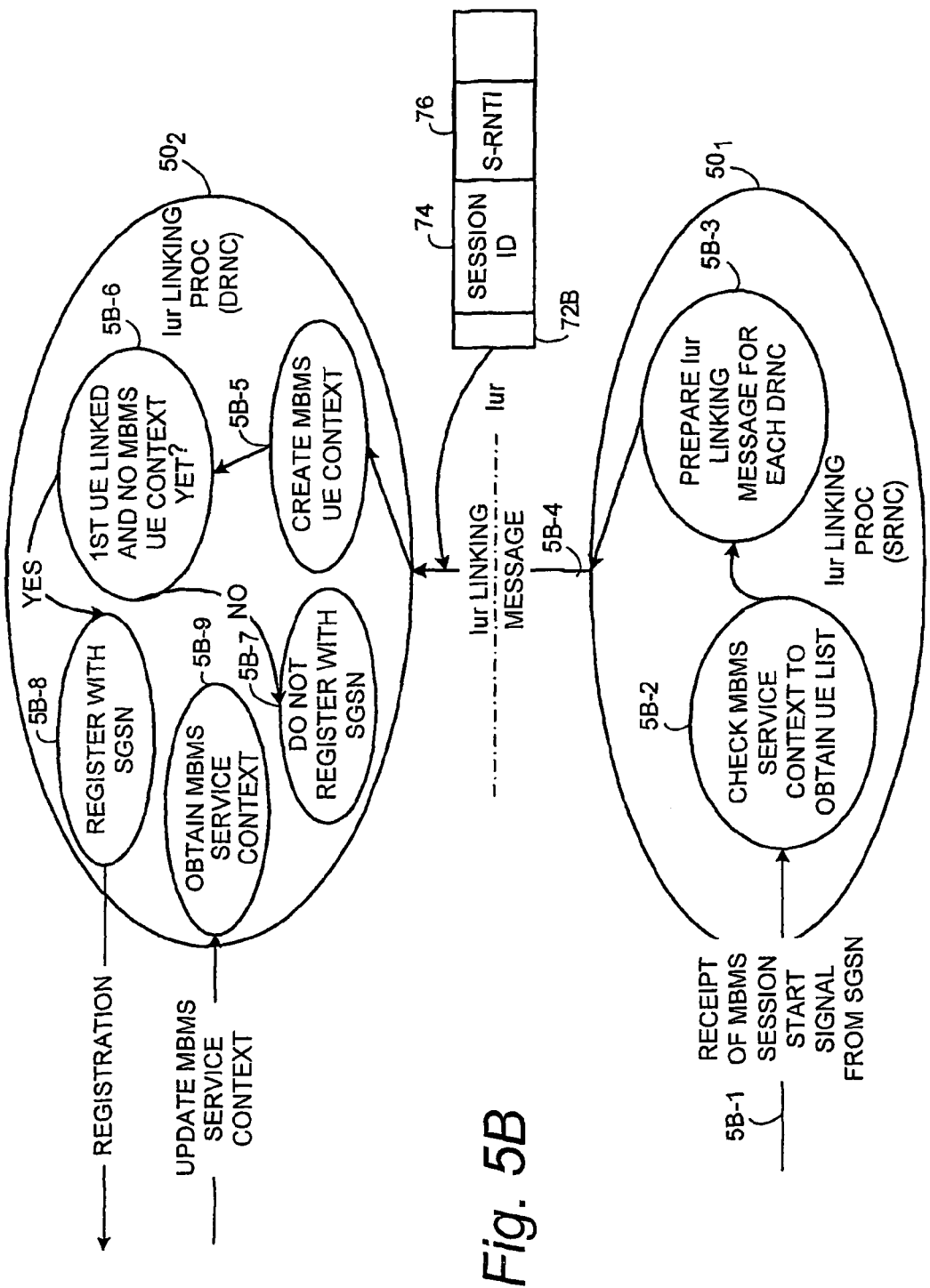
Figure 5C:
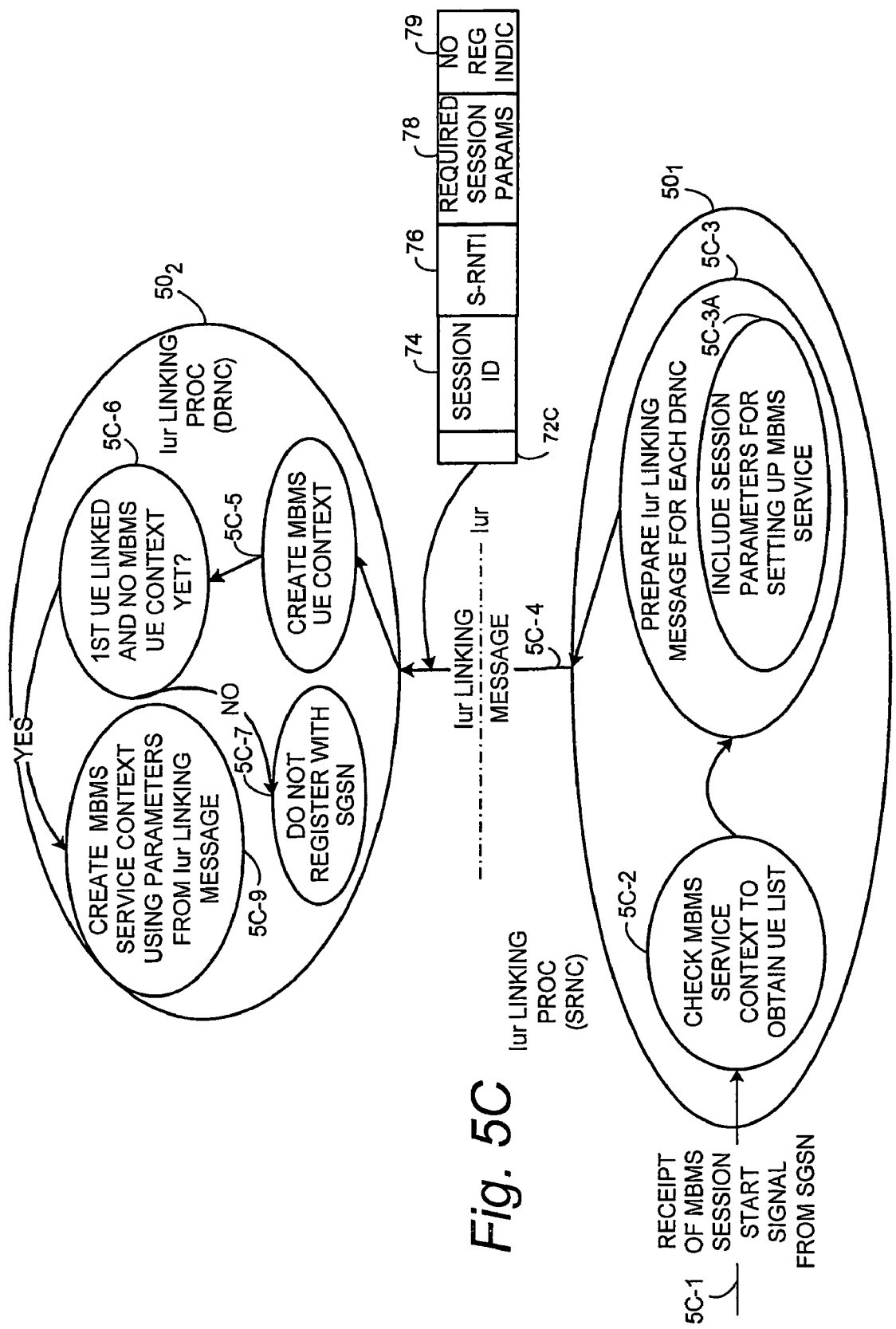

FIG. 5A, FIG. 5B, and FIG. 5C illustrate example ways in which the Iur Linking Procedure 50 can be commenced and performed. FIG. 5A shows an early Iur-linking triggered by Iu-linking; FIG. 5B shows a late Iur-linking by reception of RANAP Start Session; and FIG. 5C shows an enhanced Iur-linking with session parameters provided. The example scenarios of FIG. 5A, FIG. 5B, and FIG. 5C can be alternative scenarios, although various aspects thereof may be combined in certain implementations.

FIG. 5A shows an early Iur-linking triggered by Iu-linking, showing particularly both example actions or steps performed by Iur Linking Procedure $50A_1$ of SRNC $26_1$ and Iur Linking Procedure $50A_2$ of DRNC $26_2$. Action 5A-1 shows Iur Linking Procedure $50A_1$ receiving a MBMS UE Context for user equipment unit (UE) $20_{MBMS}$ from SGSN 30. In one example implementation, the MBMS UE Context occurs as part of a RANAP MBMS UE Linking Request message, and thus is part of an Iu-linking procedure. Upon reception of the MBMS UE context from the SGSN 30, the SRNC $26_1$ may decide (for implementation specific reasons) to provide the MBMS UE Context to the DRNC in good time before the MBMS service session starts. Accordingly, action 5A-2 shows Iur Linking Procedure $50A_1$ deciding on the time(s) at which it will provide the MBMS UE Context for user equipment unit (UE) $20_{MBMS}$ to DRNC $26_2$. Various factors may influence the decision of the time(s) to provide the MBMS UE Context. This depends, e.g., on the UE mobility or the setup of connections to SGSN for setting up a PS-RAB etc. Thereafter, at the times decided at action 5A-2, the Iur Linking Procedure $50A_1$ of SRNC $26_1$ prepares and sends an Iur Linking Message to DRNC $26_2$. Action 5A-4 shows actual transmission of the Iur Linking Message 72A from SRNC $26_1$ to DRNC $26_2$. As further shown in FIG. 5A, the Iur Linking Message 72A includes (e.g., as fields or information elements of the message) the Session Id 74 and the S-RNTI 76 of the user equipment unit (UE) $20_{MBMS}$. The Iur Linking Message 72A can take the form of a RNSAP MBMS Attach Request, for example.

FIG. 5A further shows basic actions performed by, e.g., Iur Linking Procedure $50A_2$ of RNC $26_2$. Upon reception of the RNSAP UE linking message 72A, as action 5A-5 the DRNC $26_2$ creates the MBMS UE Context $62_{DRNC}$. As action 5A-6 the Iur Linking Procedure $50A_2$ checks whether (1) user equipment unit (UE) $20_{MBMS}$ is the first user equipment unit (UE) that has been linked over the Iur interface and (2) no other MBMS UE Context has been established in DRNC $26_2$ for the corresponding MBMS service. If the result of either check is negative, no registration is attempted as reflected by action 5A-7. If the results of both checks are affirmative, i.e., in the case no MBMS Service Context exists for the MBMS service, as action 5A-8 the Iur Linking Procedure $50A_2$ of the DRNC $26_2$ registers with the appropriate SGSN. Action 5A-9 shows DRNC $26_2$ receiving the MBMS Service Context in response to the registration. The MBMS Service Context received at action 5A-9 is stored in MBMS service context memory $46_2$ of MBMS Handler $40_2$. The purpose of the RAN Registration of event 5A-8 is to enable MBMS Handler $40_2$ of RNC $26_2$ to receive the MBMS service start session message. There may be frequent Iur-linkings due to mobility in RAN before a session begins and, as a consequence, also an increased frequency of RNC registrations.

FIG. 5B shows a late Iur-linking by reception of RANAP Start Session, showing particularly both example actions or steps performed by Iur Linking Procedure $50B_1$ of SRNC $26_1$ and Iur Linking Procedure $50B_2$ of DRNC $26_2$. In the FIG. 5B scenario, user equipment units (UEs) in RRC Connected mode are linked over Iur at reception of session start. FIG. 5B shows, as action 5B-1, reception of the Session Start message which includes the Session Id for the MBMS service which is to start. The Session Start message can take the form of a RANAP MBMS Session Start message, for example. As action 5B-2, the Iur Linking Procedure $50B_1$ of SRNC $26_1$ checks the MBMS Service Context already stored in MBMS service context memory $46_1$ of SRNC $26_1$. The MBMS Service Context contains a list of RRC Connected mobiles and MBMS Service Ids for activated MBMS services. As action 5B-3 the Iur Linking Procedure $50B_1$ prepares an Iur Linking Message 72B to be sent to each appropriate DRNC. Examples fields or information elements for the Iur Linking Message 72B are also illustrated in FIG. 5B as including the Session ID 74 and the S-RNTI 76. The Iur Linking Message 72B can take the form of a RNSAP MBMS Attach Request message, for example. Action 5B-4 depicts SRNC $26_1$ sending the Iur Linking Message 72B to each DRNC.

Thereafter, Iur Linking Procedure $50B_2$ of the DRNC $26_2$ performs actions similar to those above described in conjunction with FIG. 5B, including creating the MBMS UE Context for user equipment unit (UE) $20_{MBMS}$ as action 5B-5. Further, in the case there is no MBMS Service Context established at the DRNC. $26_2$ as determined at action 5B-6, as action 5B-8 the Iur Linking Procedure 50B sends a RNC Registration message to its default SGSN and then (as action 5B-9) updates the MBMS Service Context for the DRNC in its role of CRNC to include Cell ID.

FIG. 5C shows an enhanced Iur-linking with session parameters provided, showing particularly both example actions or steps performed by Iur Linking Procedure $50C_1$ of SRNC $26_1$ and Iur Linking Procedure $50C_2$ of DRNC $26_2$. The Iur linking of FIG. 5C essentially resembles that of FIG. 5B, with a notable difference being that (as action 5C-3) the Iur Linking Procedure 50C includes in the Iur Linking Message 72C, in addition to the Session Id 74 and S-RNTI 76, the required session parameters 78 for setting up the MBMS service. An indication 79 is also provided in the Iur-linking message 72C that RNC Registration shall not be performed by the DRNC $26_2$. Therefore, upon receipt of Iur Linking Message 72C sent as action 5C-4, as action 5C-5 the Iur Linking Procedure 50C basically need only create the MBMS UE Context for user equipment unit (UE) $20_{MBMS}$, and need not register with the SGSN. Rather, if both checks of action 5C-6 are affirmative (e.g., (1) user equipment unit (UE) $20_{MBMS}$ is the first user equipment unit (UE) that has been linked over the Iur interface and (2) no other MBMS UE Context has been established in DRNC $26_2$ for the corresponding MBMS service), as action 5C-9 the Iur Linking Procedure 50C creates a MBMS Service Context using the required session parameters 78 obtained from Iur Linking Message 72C.

In the FIG. 5C scenario the Iur-linking signalling provides Start Session functionality to DRNC $26_2$ over the Iur-interface. Advantageously, there is one less MBMS procedure (registration to the SGSN 30) to implement in the FIG. 5C scenario, which saves time. The Iur-linking signalling may be optimized such that it may include a list of UEs to reduce the signalling processing in SRNC. Thus, in the FIG. 5C scenario the RNC registration procedure is not needed and it is not necessary to take considerable time to establish a procedure with a SGSN, which does not hold any MBMS Service for the session. This will typically happens when all mobiles are kept in PMM idle after joined or are in CS Connected mode.

At MBMS service session start the SRNC $26_1$ will therefore send one MBMS Attach Request message per DRNC. This may cause additional signalling load processing both in the SRNC and in the DRNC, which eventually may cause an overload problem. To reduce an overload situation, the SRNC may (as an implementation issue) decide to spread the load in time by Iu-linking in time before the session starts.

Figure 6:
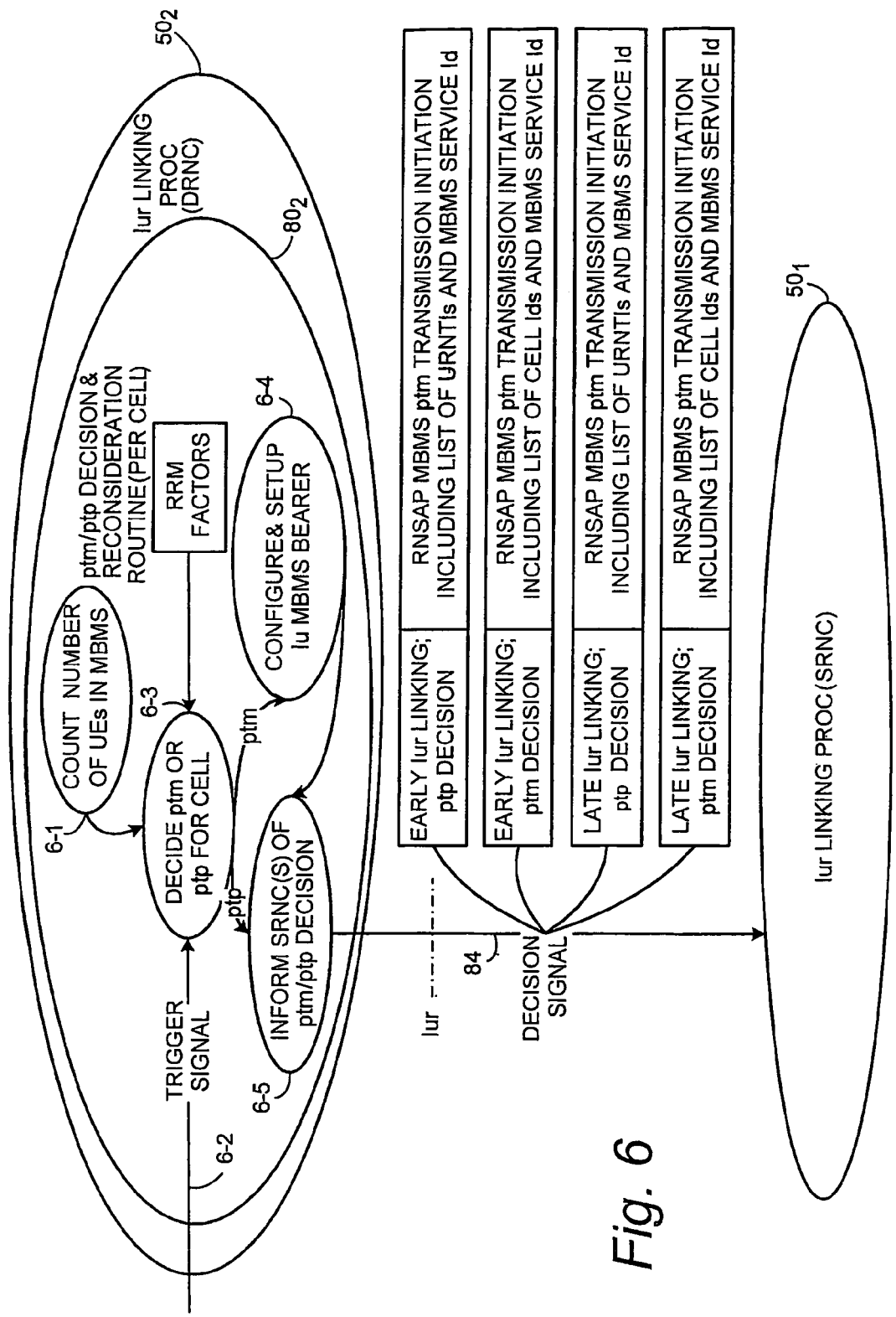
FIG. 6 is a schematic diagram showing basic, representative, example actions or events performed by or in conjunction with decision and resource configuration logic of an Iur Linking Procedure.

FIG. 6 and the ensuing description provide further details regarding a decision and resource configuration logic 44 of the Iur Linking Procedure 50 in the DRNC $26_2$ and the RNC Registration procedure. In particular, FIG. 6 shows examples actions, events, or steps performed by or in conjunction with decision and resource configuration logic 44. The actions of decision and resource configuration logic 44 illustrated in FIG. 6 can apply to and be utilized in conjunction with any of the foregoing scenarios, e.g., the scenarios of FIG. 5A, FIG. 5B, and/or FIG. 5C.

The actions of FIG. 6 are performed by decision and resource configuration logic 44 with respect to each cell controlled by DRNC $26_2$ which has a user equipment unit (UE) joined to a particular MBMS service. As action 6-1, upon reception of an Iur-linking message 72 over the Iur, the DRNC $26_2$ (in its role of CRNC) increments a counter of the number of UEs per cell that have joined the MBMS service, counting both UEs for which the RNC $26_2$ is a serving SRNC and user equipment units (UEs) for which the RNC $26_2$ is a drift RNC (DRNC).

FIG. 6 further shows decision and resource configuration logic 44 receiving an appropriate triggering signal as action 6-2. The triggering signal can be, for example, a MBMS service session start signal. Upon receipt of the triggering signal, as action 6-3 the decision and resource configuration logic 44 makes a decision, individually with respect to each $cell_i$, whether the transmission of $cell_i$ will be a point-to-multipoint (ptm) or point-to-point (ptp). The decision of action 6-3 can be based on RRM considerations (local operation and maintenance (O&M)) as well as the count tallied as action 6-1. Action 6-4 illustrates further actions performed by decision and resource configuration logic 44 in the event that a point-to-multipoint decision is reached at action 6-3. In case of a point-to-multipoint (ptm) decision, as action 6-4 the Iu MBMS bearer is configured and set up over Iu by the DRNC $26_2$. The configuration and setup of the Iu MBMS bearer is based on the MBMS service context which is stored at DRNC $26_2$. As later explained, in the case of a point-to-point (ptp) decision at action 6-3, the Iu MBMS bearer is configured and set up by the SRNC $26_1$. Action 6-5, which is performed either after action 6-3 should a point-to-point (ptp) decision be reached or after action 6-4, includes the decision and resource configuration logic 442 of DRNC $26_2$ informing the SRNC $26_1$ of the results of the ptm/ptp decision of action 6-3.

In case of not enough number of mobiles for a decision the CRNC may decide to page the idle mobiles (RRC Idle, URA_PCH) to count them in RRC Connected state.

Thus, as action 6-5, the DRNC/CRNC $26_2$ informs SRNC $26_1$ of the results of its ptm/ptp decision for each cell where there are MBMS mobiles. The decision results are communicated by a decision signal 84 illustrated in FIG. 6. In other words, the channel type (ptp/ptm) decision made by CRNC $26_2$ is signalled to each SRNC to which the DRNC $26_2$ has a DRNC-SRNC relation. This decision information can be used by the SRNC to configure its Iu MBMS bearer, e.g. to release not needed Iu MBMS bearer due absence of MBMS mobiles in case of a point-to-multipoint decision for a cell, or to set up an Iu MBMS bearer in the case of point-to-point (ptp) decision for a cell.

As indicated above, the ptp/ptm decision of action 6-3 and the resource configuration/re-configuration of action 6-4 are made on cell level and are communicated to the SRNC(s) using the decision signal 84 shown in FIG. 6. FIG. 6 further illustrates four possible alternative scenarios of content of the decision signal 84. Each scenario is set forth separately below. As a general rule, in the case where the MBMS service is delivered over point-to-multipoint, the CRNC $26_2$ indicates its ptm/ptp decision to the SRNC by sending a list of U-RNTI(s) or a list of Cell Ids together with the channel type, where the MBMS stream is delivered on a shared transport channel. On the other hand, in the case where the MBMS is delivered over a dedicated transport channel (ptp) for the UE, the CRNC $26_2$ indicates its decision by sending a list of U-RNTI(s) together with the channel type. Thus, the four scenarios of contents for decision signal 84 are as follows:

Scenario A: In case of early Iur-linking and a ptp decision is reached, the DRNC sends a RNSAP MBMS ptm Transmission Initiation including a list of U-RNTIs and MBMS Service Id.

Scenario B: In case of early Iur-linking and a ptm decision is reached, the DRNC sends RNSAP MBMS ptm Transmission Initiation including a list of Cell-Ids and MBMS Service Id.

Scenario C: In case of late Iur-linking and a ptp decision is reached, the DRNC sends RNSAP MBMS ptm Transmission Initiation including a list of U-RNTIs and/or sends the ptm/ptp decision indicator in RNSAP MBMS Attach Response message. The MBMS Service Id is included.

Scenario D: In case of late Iur-linking and a ptm decision is reached, the DRNC sends RNSAP MBMS ptm Transmission Initiation including a list of Cell-Ids and/or sends the ptm/ptp decision indicator in the Iur-linking respond message. The MBMS Service ID is included.

The decision regarding ptp/ptm for a cell (action 6-3) can be made at any point in time, e.g., from the moment when the first UE is linked to the MBMS Service Context in the CRNC up to the time when the session starts. However for a multicast scenario it is assumed that the ptp/ptm decision of action 6-3 should be made close to session start. For this reason the example triggering event 6-2 illustrated in FIG. 6 happens to be a session start signal. Yet, in the case of early Iur-linking and an early ptp/ptm decision, the DRNC may decide on ptp/ptm long before session starts. In such case the DRNC may decide to indicate its decision early to the SRNC.

The three methods where MBMS context is built up in RAN as described above are (to some extent) complementary and, in order to reduce frequent explicit registration/de-registration, alternate triggering conditions are proposed. The explicit registration which is specified for RRC connected PMM-Connected mobiles, i.e. for RRC states CELL_FACH and CELL_DCH, may easily be expanded to include also UEs in URA_PCH and CELL_PCH. This leads to an increased number of RNC registrations before MBMS session starts. The technology disclosed herein and illustrated, e.g., in FIG. 7 and FIG. 8, reduces explicit registrations so they are only performed when a point-to-multipoint MBMS transmission resource is set up. With the prior scheme the registration is performed equally for both the ptp and ptm decision. The registration with a following ptp decision takes longer time than setting up a ptp bearer without registration, so registration with ptp should be avoided.

In one aspect of operation, the DRNC 26₂ can perform a conditional or inhibited registration operation. In so doing, in a generic sense the DRNC 26₂ maintains a first counter for counting a number of events occurring at the drift radio network control node. Registration of the drift radio network control node with a core network node is advantageously delayed until the counter has exceeded a first threshold value. In one example mode illustrated by FIG. 7, the number of events occurring at the drift network control node which is counted by the counter is a number of user equipment units for which an Iur linking procedure is performed for the MBMS session. In another example mode illustrated by FIG. 8, the number of events occurring at the drift network control node which is counted by the counter are time periods elapsed since an Iur linking procedure for the MBMS session has been performed for a predetermined user equipment unit. Other example modes are also encompassed.

Figure 7:
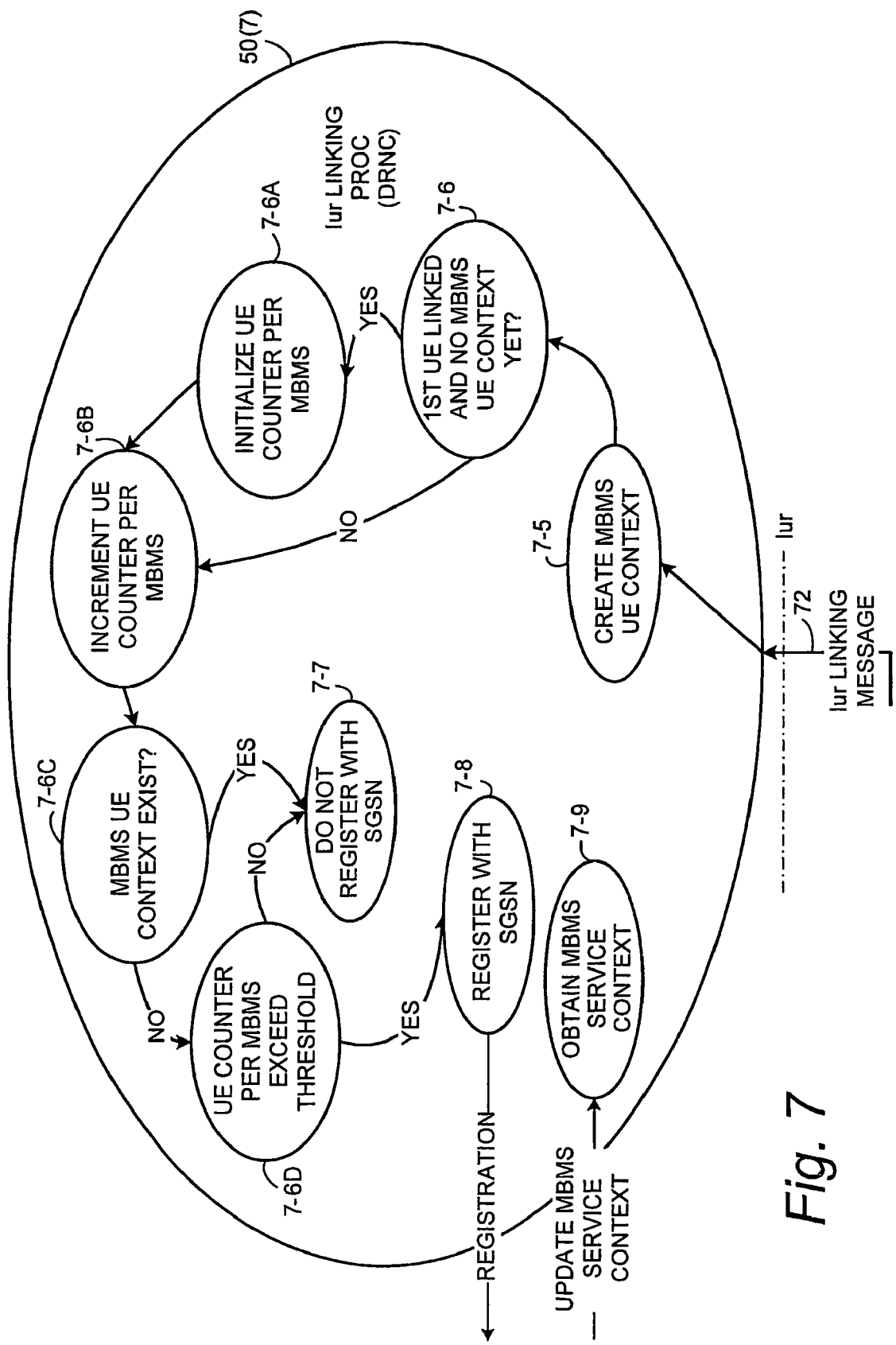
FIG. 7 is a schematic diagram illustrating a first example mode of a conditional operation wherein an Iur Linking Procedure inhibits registration with a core network.

FIG. 7 illustrates a first example mode of a conditional or inhibited registration operation. In FIG. 7 Iur Linking Procedure 50(7) of DRNC 26₂ inhibits registration so that the DRNC will only register to the packet switch core network (PS CN), e.g., SGSN 30, when the number of user equipment units (UEs) joining the particular MBMS service is above a threshold which warrants that at least one point-to-multipoint MBMS radio bearer be set up in the DRNC for the MBMS service. The reason for such conditional inhibiting is that the CRNC/DRNC may regard the registration as a request for Iu bearer to be set up for one or several cells in the RNC for MBMS transmission on a shared radio bearer resource. Care must be taken to know the timing when to send the RANAP Registration Indication. If the RANAP Registration Indication is sent too early, it may turn out that, at session start (by reception of RANAP Start Indication), the number of UEs has fallen below the threshold. If, on the other hand, the RANAP Registration Indication is sent too late, the packet switch core network (e.g., SGSN 30) may not be able to send the Start Indication (Pure DRNC case) in time for the session. For the ptp case the MBMS transmission path only includes the SRNC Iu bearer.

FIG. 7 thus shows basic actions performed by, e.g., Iur Linking Procedure 50(7) of RNC 26₂ for such a registration conditional inhibit mode. Upon reception of the RNSAP UE linking message 72, as action 7-5 the DRNC 26₂ creates the MBMS UE context Context 62$_{DRNC}$. As action 7-6 the Iur Linking Procedure 50(7) checks whether (1) user equipment unit (UE) 20$_{MBMS}$ is the first user equipment unit (UE) that has been linked over the Iur interface and (2) no other MBMS UE Context has been established in DRNC 26₂ for the corresponding MBMS service. If the results of both checks are affirmative, i.e., in the case no MBMS Service context Context exists for the MBMS service, as action 7-6A Iur Linking Procedure 50(7) initializes a UE counter per MBMS service. The UE counter per MBMS service is used by Iur Linking Procedure 50(7) to keep counts of the number of user equipment units (UEs) in cells controlled by the DRNC which have joined or intend to access a particular MBMS service. After initialization (at zero) of the UE counter per MBMS service at action, 7-6A, as action 7-6B the UE counter per MBMS service is incremented and thereby count the first UE.

Had it been determined as action 7-6 that the linked UE was not the first UE to be linked for the MBMS service, as action 7-6B the UE counter per MBMS service is incremented to thereby count this non-first UE.

After the incrementation of action 7-6B, as action 7-6C the Iur Linking Procedure 50(7) checks whether the MBMS Service Context has already been obtained by DRNC 26₂. If the MBMS Service Context has already been obtained by DRNC 26₂, then likely the DRNC is already registered with the SGSN and there is no need to do so again (as reflected by action 7-7). On the other hand, if the MBMS Service Context has not already been obtained by DRNC 26₂, as action 7-6D the Iur Linking Procedure 50(7) of the DRNC 26₂ makes a yet further (inhibiting) check.

In particular, as action 7-6D the Iur Linking Procedure 50(7) checks whether the value of the UE per MBMS service counter incremented at action 7-6B exceeds a threshold. The threshold can be predetermined or dynamically determined. If the value of the UE per MBMS service counter does not exceed the threshold, no registration to the core network is now performed (action 7-7). On the other hand, if the threshold is exceeded, the Iur Linking Procedure 50(7) registers in with the appropriate SGSN as action 7-8. Action 7-9 shows DRNC 26₂ receiving the MBMS Service Context in response to the registration.

Thus, the Iur Linking Procedure 50(7) of FIG. 7 defines a counter and a first threshold value for user equipments that intend to register for an MBMS-session, and delays registration of the user equipments towards the core network until said counter has exceeded the threshold value. The counter counts the number of user equipments per MBMS service and the first threshold value corresponds to a certain number of user equipments.

The registration conditional inhibit mode illustrated in FIG. 7 is applicable and can be utilized in conjunction with other modes, embodiments, or scenarios including, for example, those previously described with reference to FIG. 5A, FIG. 5B, and/or FIG. 5C. One example possible implementation in this regard is to add actions such as action 7-6A, action 7-6B, action 7-6C, and action 7-6D in corresponding logic locations for the actions of FIG. 5A, FIG. 5B, and/or FIG. 5C.

Figure 8:
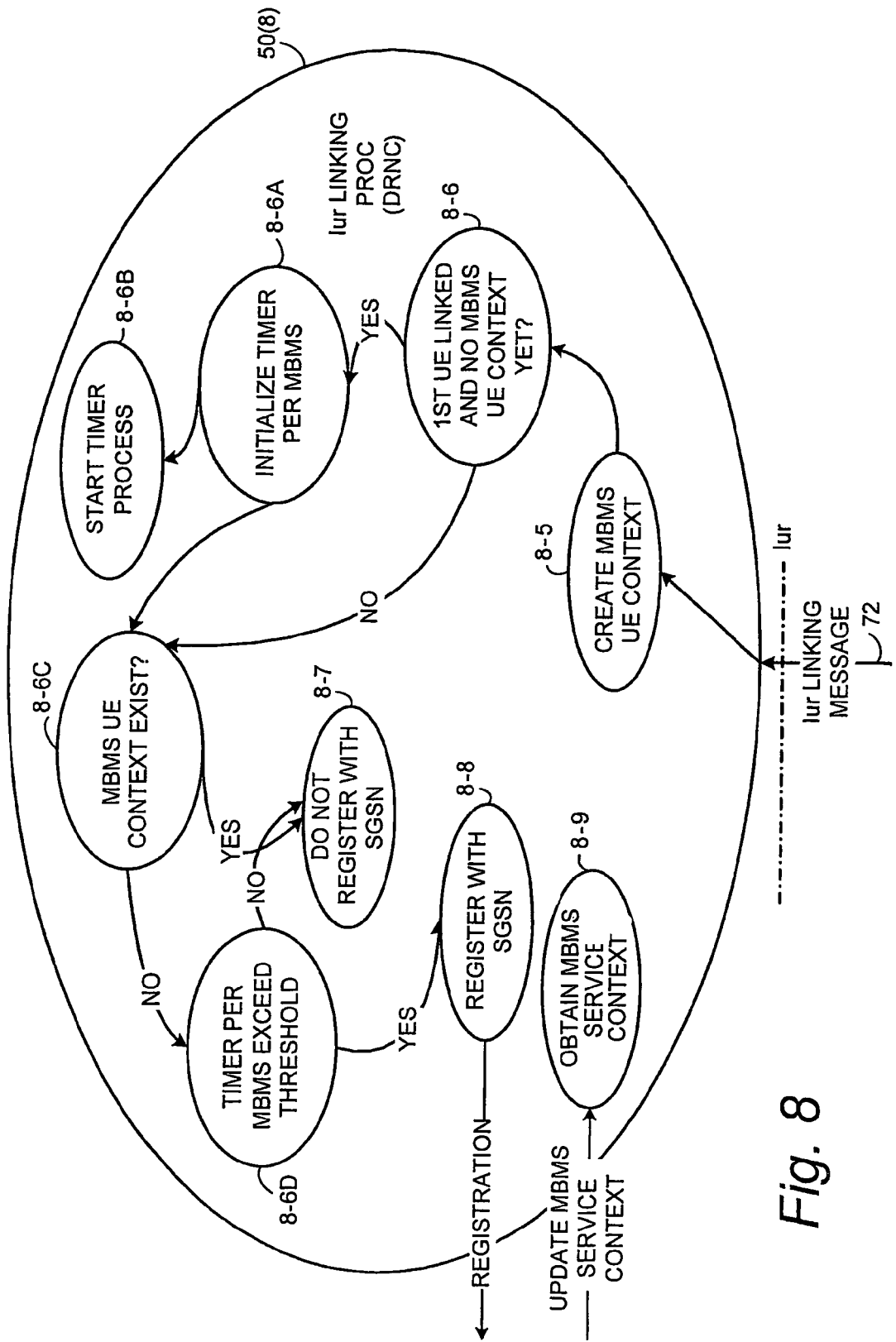
FIG. 8 is a schematic diagram illustrating a second example mode of a conditional operation wherein an Iur Linking Procedure inhibits registration with a core network.

FIG. 8 illustrates a second example mode of a conditional or inhibited registration operation. In FIG. 8 Iur Linking Procedure 50(8) of DRNC 26$_2$ inhibits the registration such that the DRNC will only register to the packet switch core network (PS CN), e.g., SGSN 30, after a certain time has elapsed after creation of the MBMS UE Context 62 for the first UE for which the Iur Linking Procedure 50(8) has been performed. The prerequisite elapse time is set as a time which warrants that at least one point-to-multipoint ptm MBMS radio bearer be set up in the DRNC for the MBMS service.

FIG. 8 thus shows basic actions performed by, e.g., Iur Linking Procedure 50(8) of RNC 26$_2$ for the second example registration conditional inhibit mode. Upon reception of the RNSAP UE linking message 72, as action 8-5 the DRNC 26$_2$ creates the MBMS UE context Context 62$_{DRNC}$. As action 8-6 the Iur Linking Procedure 50(7) checks whether (1) user equipment unit (UE) 20$_{MBMS}$ is the first user equipment unit (UE) that has been linked over the Iur interface and (2) no other MBMS UE Context has been established in DRNC 26$_2$ for the corresponding MBMS service. If the results of both checks are affirmative, i.e., in the case no MBMS Service context Context exists for the MBMS service, as action 8-6A Iur Linking Procedure 50(8) initializes a timer per MBMS service. After initialization of the timer per MBMS service, a timer process is started as action 8-6B. The timer process updates the timer with a clock or the like, so that the timer per MBMS service can be used by Iur Linking Procedure 50(8) to keep track of the time elapsed after the Iur Linking Procedure 50(8) is performed for the first UE for a particular MBMS service (there being a separate timer per MBMS for each MBMS service). The timer process of action 8-6B runs automatically and does not terminate until after registration has occurred for the DRNC.

Had it been determined as action 8-6 that the linked UE was not the first UE to be linked for the MBMS service, the timer initialization action 7-6A is skipped and processing continues with action 8-6C.

As action 8-6C, the Iur Linking Procedure 50(7) checks whether the MBMS Service Context has already been obtained by DRNC 26$_2$. If the MBMS Service Context has already been obtained by DRNC 26$_2$, then likely the DRNC is already registered with the SGSN and there is no need to do so again (as reflected by action 8-7). On the other hand, if the MBMS Service Context has not already been obtained by DRNC 26$_2$, as action 7-8D the Iur Linking Procedure 50(7) of the DRNC 26$_2$ makes a yet further (inhibiting) check.

In particular, as action 8-6D the Iur Linking Procedure 50(7) checks whether the value of the timer per MBMS service exceeds a threshold. The timer per MBMS service has been continually or periodically updated by the timer process 8-6B, so that when the timer per MBMS service is check as action 8-6D a suitable determination can be made as to how much time has elapsed since the Iur Linking Procedure 70(8) was performed for the first UE. The threshold of action 8-6D can be predetermined or dynamically determined. If the value of the timer per MBMS service does not exceed the threshold, no registration to the core network is now performed (action 7-7). On the other hand, if the threshold is exceeded, the Iur Linking Procedure 50(7) registers in with the appropriate SGSN as action 7-8. Action 7-9 shows DRNC 26$_2$ receiving the MBMS Service Context in response to the registration.

The second registration conditional inhibit mode illustrated in FIG. 8 is likewise applicable and can be utilized in conjunction with other modes, embodiments, or scenarios including, for example, those previously described with reference to FIG. 5A, FIG. 5B, and/or FIG. 5C. One example possible implementation in this regard is to add actions such as action 8-6A, action 8-6B, action 8-6C, and action 8-6D in corresponding logic locations for the actions of FIG. 5A, FIG. 5B, and/or FIG. 5C.

Thus, as illustrated by FIG. 8, the counter of the FIG. 7 embodiment could alternatively count a pre-determined period of time and the first threshold value corresponds to a certain time value.

Thus, RNC registration by the DRNC is feasible in case of a ptm decision. The RNC registration may be linked to the ptm/ptp decision rather than merely registering to the default SGSN when the first UE is linked by 50 by the DRNC.

For the point-to-point (ptp) case there is no need to register to the core network (CN) in case of late Iur-linking. For the point-to-multipoint case and late Iur-linking it is feasible to register to the core network (CN).

Figure 9:
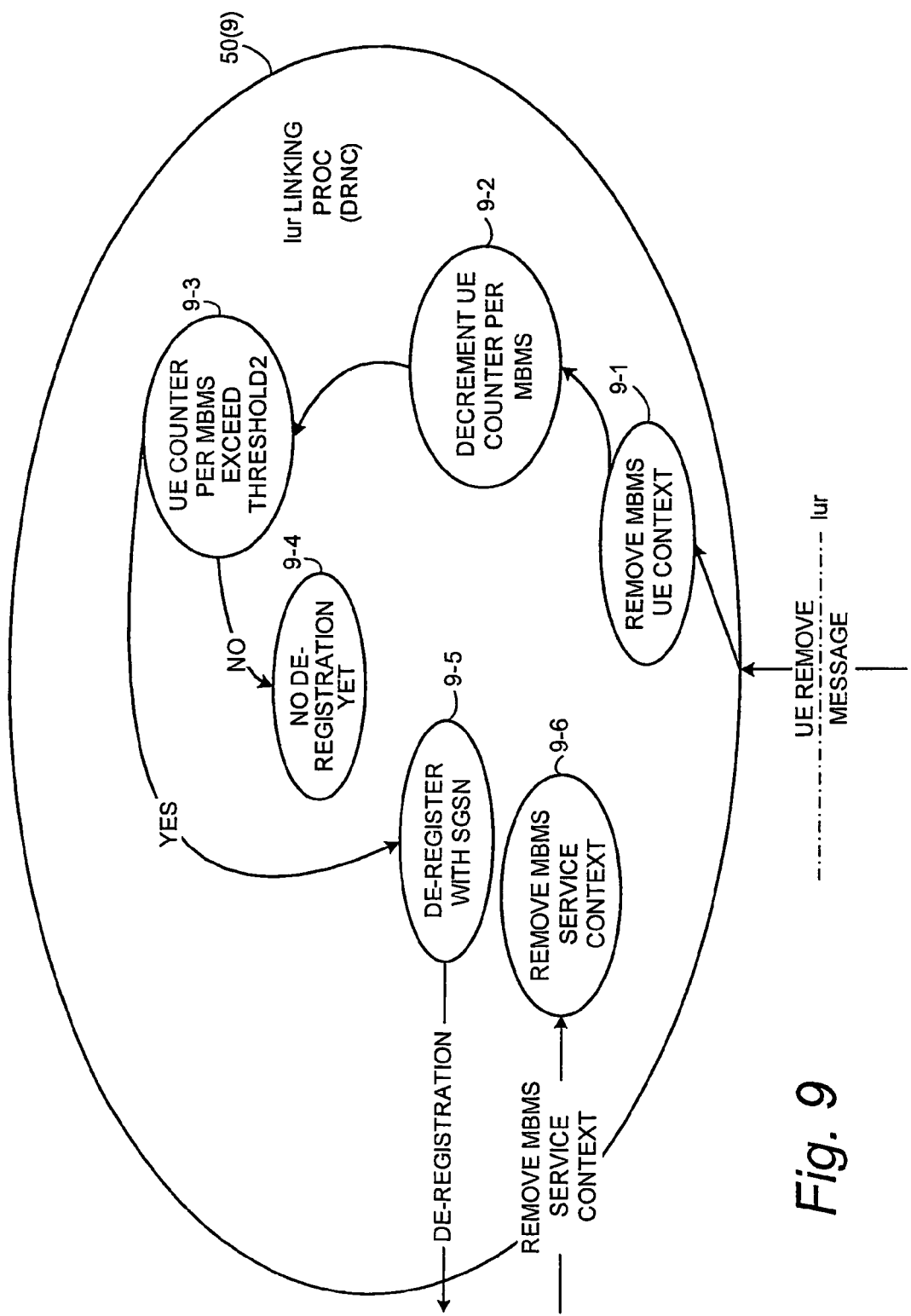
FIG. 9 is a schematic diagram illustrating an example de-registration routine for Iur Linking Procedure Logic.

FIG. 9 shows a first example deregistration routine which can be performed by Iur Linking Procedure 50(9). Action 9-1 shows the Iur Linking Procedure 50(9) removing a MBMS UE Context for a particular UE no longer joined to a particular MBMS service. The removal can occur in response to a removal signal or the like. As action 9-2 the Iur Linking Procedure 50(9) decrements the UE per MBMS counter to reflect the removal of action 9-1. As action 9-3 the Iur Linking, Procedure 50(9) checks whether the value of the UE per MBMS counter falls below a second threshold. If not, the DRNC does not yet seek de-registration with respect to the SGSN 30 for the particular MBMS service. If the value of the UE per MBMS counter has fallen below the second threshold, as action 9-4 the Iur Linking Procedure 50(9) proceeds to de-register the DRNC with respect to the SGSN 30 for the particular MBMS service. Prudently choosing the value of the second threshold of action 9-3 relative to the first threshold of FIG. 7 may provide a certain hysteresis protection.

It will be appreciated that whereas the first example conditional registration inhibit routine of FIG. 7 can be paired with the first deregistration routine of FIG. 9, so also a second deregistration routine can be paired with the clock-based second example conditional registration inhibit routine of FIG. 8. Although details of such a second deregistration routine are not particularly illustrated herein, the actions encompassed thereby can be ascertained by analogy from the drawings and the application text.

In case of early Iur-linking the explicit registration is required but has potential impacts on the core network (CN) and the radio access network (RAN) due to unnecessary registration/deregistration to the CN due to mobility in RAN before session starts.

Registration could, e.g., be based on prediction of the number of users based on number of Iur-linking during a predefined time, e.g. frequent number of cell updates, URA updates.

Less resolution such that passing the threshold for one cell shall not lead to a ptm decision, due to increased probability that neighbouring cell will take some of the traffic and therefore triggering conditions is enhanced to involve threshold per cell and number of cells the CRNC is controlling.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

The invention claimed is:

1. A method for registration of a drift Radio Network Controller (DRNC) to be capable of handling user equipment units (UE) supporting multimedia broadcast multicast service (MBMS), said method performed in a radio network control node acting across an Iur interface as a drift radio network control node for one or more user equipment units registering for a MBMS session, said method comprising the steps of:
    defining a counter and a first threshold value, wherein said threshold value is a positive integer;
    using the counter for counting of a set of power consuming events occurring at the drift radio network control node; and,
    delaying registration of the drift radio network control node with a core network node until the counter has exceeded the first threshold value.

2. The method according to claim 1, wherein the events occurring at the drift network control node which is counted by the counter is a number of user equipment units for which a Iur linking procedure is performed for the MBMS session.

3. The method according to claim 1, wherein the events occurring at the drift network control node which is counted by the counter are time periods elapsed since an Iur linking procedure for the MBMS session has been performed for a predetermined user equipment unit.

4. The method according to claim 1, further comprising the steps of:
    defining a second threshold value; and,
    delaying deregistration of the drift network control node until the counter has a value below the second threshold value.

5. The method according to claim 4, wherein the second value is selected to provide hysteresis protection.

6. A radio network control node acting across an Iur interface as a drift radio network control node for a user equipment unit (UE) in a communications system supporting a multimedia broadcast multicast service (MBMS), comprising:
    a first counter for counting a set of power consuming events occurring at the drift radio network control node; and,
    means for delaying registration of the drift radio network control node with a core network node until the counter has exceeded a first threshold value wherein said threshold value is a positive integer.

7. The radio network control node according to claim 6, wherein the events occurring at the network control node which is counted by the counter is a number of user equipment units for which a Iur linking procedure is performed for the MBMS session.

8. The radio network control node according to claim 6, wherein the events occurring at the drift network control node which is counted by the counter are time periods elapsed since an Iur linking procedure for the MBMS session has been performed for a predetermined user equipment unit.

9. The radio network control node according to claim 6, further comprising means for delaying deregistration of the drift network control node until the counter has a value below a second threshold value.

10. The radio network control node according to claim 9, wherein the second threshold value is selected to provide hysteresis protection.

* * * * *